(54) HANDSET BASED AUTOMATIC CALL RE-INITIATION FOR MULTI-MODE HANDSETS (75) Inventors: Michael Charles Gerald Lee, Ottawa; Francis Durufle, Hull, both of (CA)

(73) Assignee: Nortel Networks Limited, Montreal (CA)

( * ) Notice: Under 35 U.S.C. 154(b), the term of this patent shall be extended for 0 days.

(21) Appl. No.: 09/124,000

(22) Filed: Jul. 29, 1998

(51) Int. Cl.[7] .................................................... H04Q 7/20
(52) U.S. Cl. ............................ 455/425; 455/421; 455/552
(58) Field of Search .................................... 455/425, 436, 455/437, 421, 552, 553, 563, 564, 67.1, 67.7

(56) References Cited

U.S. PATENT DOCUMENTS

| | | | | |
|---|---|---|---|---|
| 5,533,099 | * | 7/1996 | Byrne .................................. | 455/552 |
| 5,544,224 | * | 8/1996 | Jonsson et al. ....................... | 455/434 |
| 5,574,775 | * | 11/1996 | Miller, II et al. ...................... | 45/414 |
| 5,594,718 | * | 1/1997 | Weaver, Jr. et al. .................. | 370/331 |
| 5,659,598 | | 8/1997 | Byrne et al. .......................... | 455/436 |
| 5,668,837 | | 9/1997 | Dent ..................................... | 375/316 |
| 5,809,414 | * | 9/1998 | Coverdale et al. ................... | 455/421 |
| 5,987,334 | * | 11/1999 | Kaku ..................................... | 455/552 |
| 6,021,328 | * | 2/2000 | Curtis et al. .......................... | 455/443 |
| 6,032,040 | * | 2/2000 | Choy et al. ........................... | 455/414 |

\* cited by examiner

*Primary Examiner*—Dwayne Bost
*Assistant Examiner*—Erika A Gary (57) ABSTRACT

In the occurrence of a multi-mode portable handset leaving the coverage area of a first operating network during an active telephone call on the first operating network, a method is disclosed for terminating the telephone call and re-initiating it within a second operating network. The signal strength and bit error rate corresponding to the first operating network are monitored during the telephone call. When it is determined that the handset is leaving the coverage area using these indicators, the handset warns both parties in the conversation. With use of the redial function or CLID (Calling Line Identification) the telephone number of the party other than the user of the portable handset is determined. The handset proceeds to terminate the call on the first operating network and dials the telephone number corresponding to the other party on the second operating network. The telephone conversation can then proceed on the second operating network with a minimum inconvenience to the user of the handset.

29 Claims, 4 Drawing Sheets

HANDSET BASED AUTOMATIC CALL RE-INITIATION FOR MULTI-MODE HANDSETS

FIELD OF THE INVENTION

This invention relates to a system and method for portable telephone handsets to operate within radio communication systems and more specifically to the operation of multi-mode telephone handsets within a plurality of radio communication systems.

BACKGROUND OF THE INVENTION

There are currently many different radio standards in existence in North America and elsewhere. For example, in North America the frequency band 824–894 MHz (824 to 849 MHz for handset transmit and 869 to 894 MHz for handset receive) is reserved for cellular communication systems among which are AMPS (Analog Mobile Phone System) analog cellular defined by the standard EIA/TIA-553 (Electronic Industry Association/Telecommunications Industry Association Standard 553), TDMA (Time Division Multiple Access) digital cellular defined by the standard EIA/TIA/IS-136 (where IS means Interim Standard) and CDMA (Code Division Multiple Access) digital cellular defined by the standard EIA/TIA/IS-95. The frequency band 1850–1990 MHz (1850 to 1910 MHz for handset transmit and 1930 to 1990 MHz for handset receive) is, on the other hand, reserved for PCS (Personal Communication System) and the three main standards operating in this band are J-Std-009 which defines upband TDMA, J-Std-008 which defines upband CDMA, and J-Std-007 which defines PCS1900. PCS1900 is based on the European GSM (global System for Mobile), but operates in the North American PCS band.

A radio receiver designed to operate in compliance with one of the standards is not generally able to operate with any of the other standards. The fact that the cellular systems generally all have different advantages and disadvantages make it difficult for customers to gain all their desired properties in a single portable handset using a single cellular standard. For example, AMPS has an extremely large coverage area in North America while the coverage area for PCS1900 currently is limited to high population areas and high traffic highways. On the other hand, users of the PCS1900 system gain advanced features such as call display, secure communications, longer handset battery life, and a greater cost efficiency compared to the AMPS users.

To allow customers to increase the flexibility between cellular standards, a great deal of design research has been conducted to allow a single portable handset to operate within a plurality of cellular standards, such handsets are hereinafter referred to as multi-mode handsets. An example of a desirable multi-mode handset is one which is capable of operating in both the PCS1900 and AMPS networks, therefore gaining the added benefits of the PCS system while allowing the use of the AMPS network while communicating out of the PCS1900 coverage area. The operation of such a handset can be described as being dual-band/dual-mode since it must operate at two different frequency bands and also in two different modes.

For example, Nokia Mobile Phones Limited of Salo, Finland has designed a multi-mode handset with Nokia product number 6190 that allows the user to switch from the PCS1900 network to the AMPS network with the addition of an AMPS module. The user of the telephone removes the battery from the original handset, adds the AMPS module, and then reattaches the battery. At that point, the user can initiate a cellular call within the AMPS standard. Beyond the obvious disadvantage of an additional cumbersome module to carry around, this implementation makes it impossible for a user of the multi-mode handset to easily transfer from one cellular standard to another when the phone is in an activated mode.

There are currently PCS1900/AMPS multi-mode handsets that do not require the use of such cumbersome add-on modules. One key advantage of these new portable phones is the possibility of allowing a hand-over of an active call between different cellular standards to take place. Unfortunately, there is currently no system interaction between such networks as PCS1900 and AMPS. Thus while a person can place or receive a call on either system if they have a multi-mode handset, there is no facility for handing over an active call from one system to the other. The fundamental problem with such a hand-over is the complexity involved in coordinating two completely different radio systems which are owned and operated by different competing companies. To establish an effective and efficient hand-over procedure at the network and/or base station level, an increase in cooperation between these companies is required. Such cooperation presently does not seem likely in the near future.

A procedure is thus needed that can allow for the hand-over between competing cellular standards without requiring additional network cooperation or infrastructure. Such a solution must therefore be capable of implementation fully within a suitable multi-mode handset.

SUMMARY OF THE INVENTION

It is an object of the present invention to overcome the disadvantage of the prior art and, in particular, to provide a technique for warning a portable handset in operation within a first operating network when the handset is proceeding out of the coverage area corresponding to the first operating network.

A further object of the present invention is to provide a technique for handing over an active telephone call from the first operating network to a second operating network with a different standard when the handset leaves the coverage area corresponding to the first operating network.

According to a first broad aspect, the present invention provides in a portable telephone handset capable of functioning within a plurality of operating networks respectively operating under different standards, a method of handing an active telephone call over between networks to maintain the integrity of the call, the method comprising the steps of: monitoring at least one signal parameter corresponding to a first operating network during a first active telephone call on the first operating network between a user of the portable handset and another party, the user of the handset or the other party being the calling party; and producing a warning message if the signal parameter is not within a predetermined acceptable range.

In a particular embodiment, the step of producing a warning message comprises requesting both the user of the handset and the other party to hang up, and the method further comprises the steps of: determining a telephone number corresponding to the other party if the telephone number can be accessed; and subsequent to both the user of the portable handset and the other party hanging up, initializing a second active telephone call from the portable handset to the other party on a second operating network if the telephone number corresponding to the other party can be accessed.

According to a second broad aspect, the present invention provides a telephone portable handset capable of functioning within a plurality of operating networks respectively operating under different standards, the portable handset comprising: a monitoring means used to periodically determine at least one signal parameter corresponding to a first operating network during a first active telephone call between a user of the portable handset and another party, the user of the portable handset or the other party being the calling party; and a warning means used to send a warning message to the user of the portable handset and the other party if the at least one signal parameter is not within a predetermined acceptable range.

BRIEF DESCRIPTION OF THE DRAWINGS

The preferred embodiment of the present invention will now be described with reference to the following figures, in which.

DETAILED DESCRIPTION OF THE PRESENT INVENTION

Figure 1:
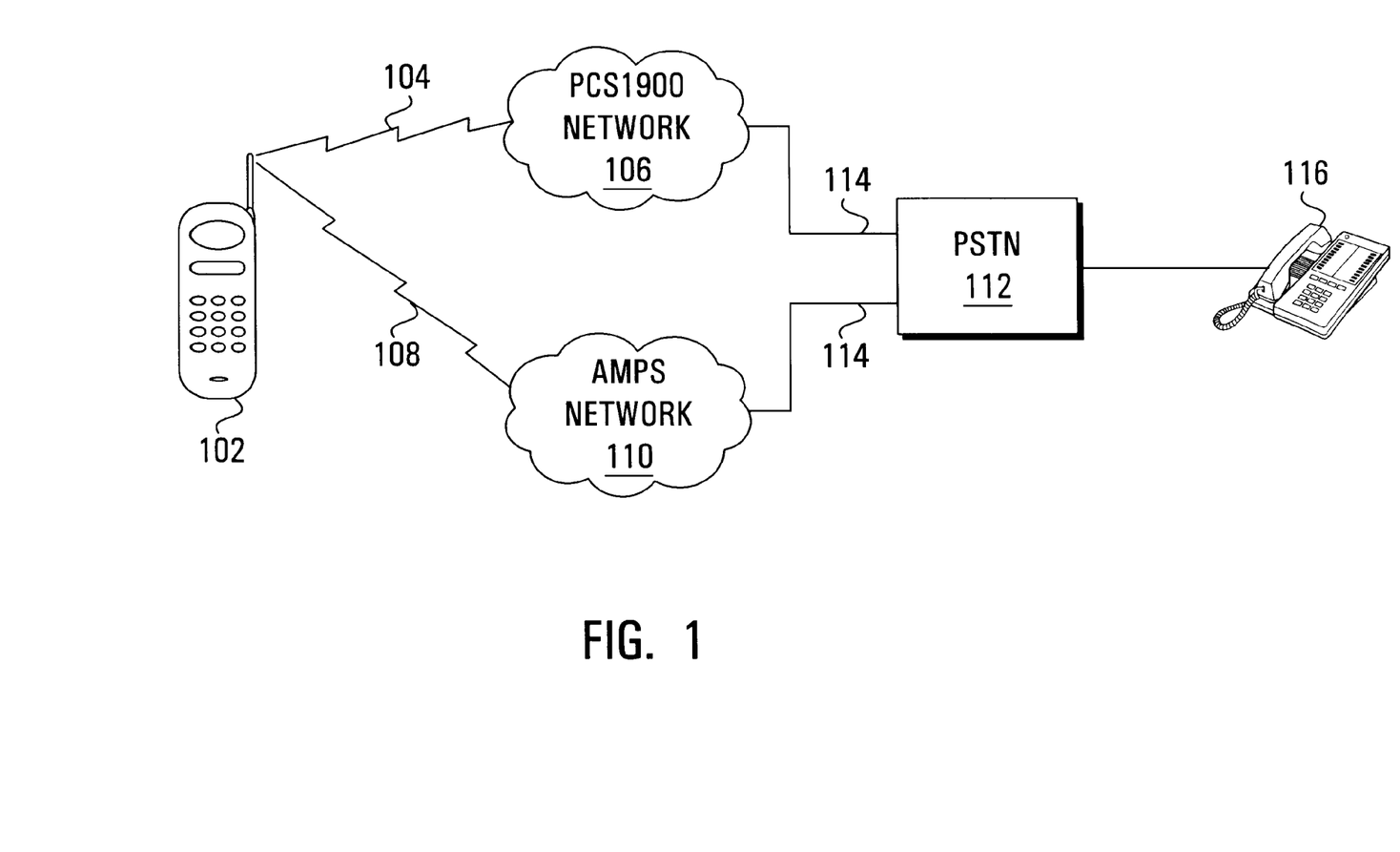
FIG. 1 illustrates a portable telephone network which supports a PCS1900/AMPS multi-mode portable handset.

The preferred embodiment of the present invention requires a portable handset capable of communications in both the PCS1900 TDMA network and the AMPS network. FIG. 1 illustrates such a network setup for a PCS1900/AMPS multi-mode portable handset as contemplated by the present invention. Such a multi-mode handset 102 is able to communicate on a PCS radio channel 104 with a PCS1900 network 106, as well as on an AMPS radio channel 108 with an AMPS network 110. Both networks 106,110, comprising base stations and switching centers, are connected to the PSTN (Public Switched Telephone Network) 112 through fixed wires 114. The multi-mode handset 102 can initiate a call with or receive a call from a fixed line handset 116 connected to the PSTN 112 through either the PCS1900 network 106 or the AMPS network 110. Alternatively, the multi-mode handset 102 can initiate or receive a call for another portable telephone handset (not shown) coupled to the PCS1900 network 106 or the AMPS network 110.

The multi-mode handset 102 as contemplated in the preferred embodiment of the present invention is now described with reference to FIG. 2. The handset 102 comprises an antenna 202 connected through an AMPS/PCS switch 204 to AMPS circuitry 206 and PCS circuitry 208 which are both further connected to a DSP (Digital Signal Processor) 210. The DSP 210, controlled by a microcontroller 212, is further connected via an audio D/A (Digital to Analog) converter 214 to a speaker 216 and via an audio A/D (Analog to Digital) converter 218 to a microphone 220. The micro-controller 212 is connected to a memory 222, is controlled by the user through a keypad 224, controls an LCD (Liquid Crystal Display) 226, and generates control signals 1 and 2.

The antenna 202 is a dual band antenna which is capable of functioning at two different frequency bands: 1850 to 1990 MHz for PCS1900 operation and 824 to 894 MHz for AMPS operation. Each frequency is further divided into a transmit and receive band for each system. For PCS1900 operation, the handset receive frequency band is from 1930 to 1990 MHz and the handset transmit frequency band is from 1850 to 1910 MHz. The corresponding AMPS operation has a receive frequency band from 869 to 894 MHz and a transmit frequency band from 824 to 849 MHz.

The AMPS/PCS switch 204 selects either the AMPS circuitry 206 or the PCS circuitry 208 to be connected between the antenna 202 and the DSP 210. The operation of the AMPS/PCS switch 204 is controlled by the control signal 1 generated in the microcontroller 212.

When the AMPS/PCS switch 204 selects the AMPS mode of operation the antenna 202 is connected to the DSP 210 via the AMPS circuitry 206. The AMPS circuitry 206 comprises an AMPS duplexer 228, a receive path comprising an AMPS radio receiver 230 and an AMPS A/D converter 232, and a transmit path comprising an AMPS radio transmitter 234 and an AMPS D/A converter 236. The duplexer 228 splits the signals input from the antenna 202 into AMPS receive frequency band (869 to 894 MHz) signals and AMPS transmit frequency band (824 to 849 MHz) signals. AMPS networks operate in a frequency division duplex mode, in which different frequencies are used for radio transmission and reception. An AMPS handset always transmits and receives at the same time, and it is the function of the duplexer 228 to separate the transmit and receive radio signals.

When the AMPS/PCS switch 204 selects the PCS mode of operation, the antenna 202 is connected to the DSP 210 via the PCS circuitry 208. The PCS circuitry 208 comprises a PCS Tx/Rx (Transmit/Receive) switch 238 which selects between a receive path comprising a PCS1900 radio receiver 240 and a PCS A/D converter 242, and a transmit path comprising a PCS1900 radio transmitter 244 and a PCS D/A converter 246. PCS1900 networks operate in a frequency division duplex mode, where different frequencies are used for transmitting and receiving. In addition, the preferred embodiment of the present invention uses a PCS1900 network that operates in a TDMA (Time Division Multiple Access) mode in which different time slots are used by the PCS1900 handset 102 to transmit and receive. The PCS Tx/Rx switch 238 selects the appropriate time slot for transmitting information to a base station and the appropriate time slot for receiving information from the base station. This time slot selection is synchronized with the base station and is controlled by the microcontroller 212 through control signal 2.

Figure 3:
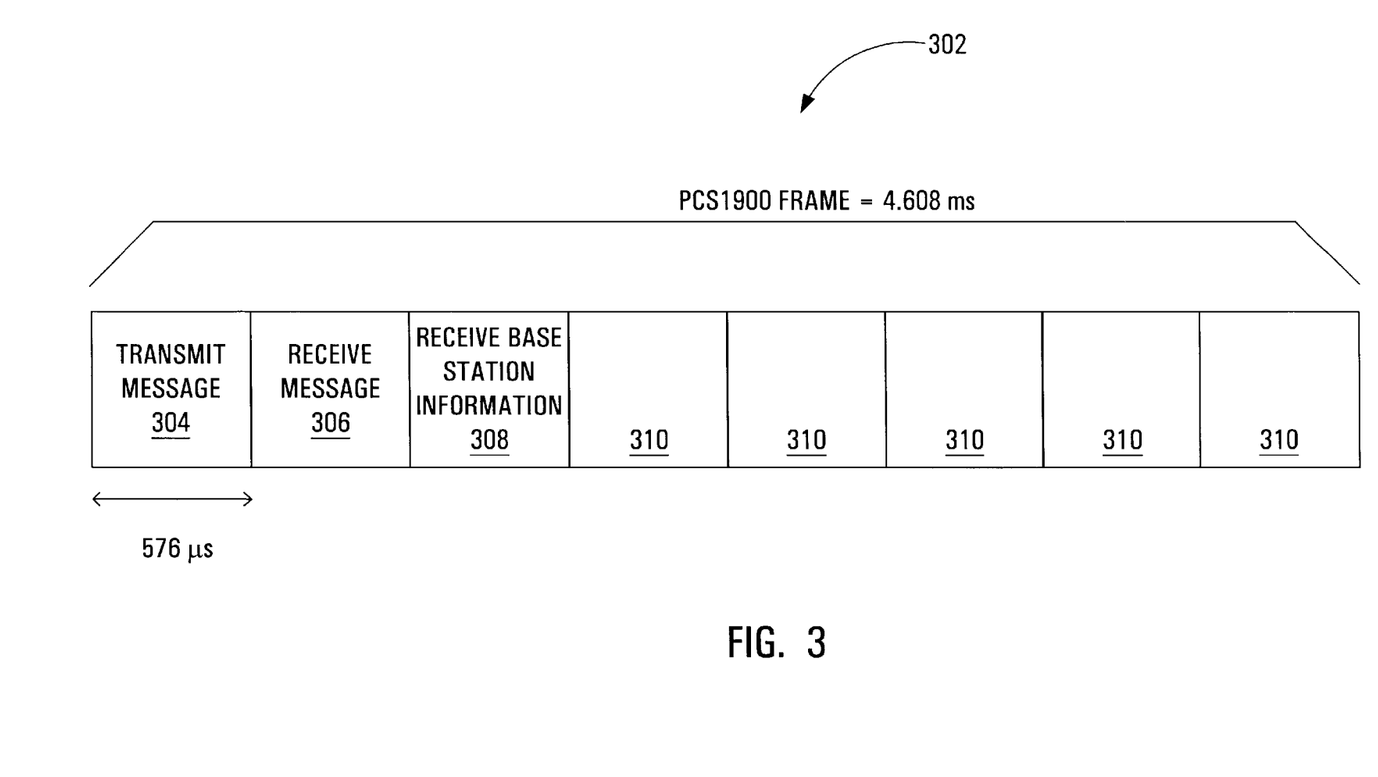
FIG. 3 illustrates the structure of a typical PCS1900 TDMA frame.

A standard PCS1900 TDMA frame 302 consisting of 8 equally divided time slots is depicted in FIG. 3. The entire frame 302 spans a period of 4.608 ms with each individual time slot having a duration of 576 $\mu$s. The PCS1900 handset 102 transmits information during a first time slot 304, receives information during a second time slot 306, receives information concerning alternative PCS base stations during a third time slot 308, and has 5 empty time slots 310 in which no functions are normally performed. The empty time slots 310 may be used by other handsets in the system to communicate with the base station.

During the first time slot 304, analog audio signals are input from the microphone 220 into the audio A/D converter 218 and are converted to digital audio signals which are input to the DSP 210. The DSP 210 encodes the digital signals into the PCS1900 required format, combines the result with command and control information from the microcontroller 212, and codes the resultant signals in a format suitable for error detection at the base station. The coded signals are input to the PCS D/A converter 246 and converted into analog baseband signals which are further input into the PCS1900 transmitter 244. The PCS1900 transmitter 244 modulates a high frequency radio signal with the analog baseband signals to generate a radio signal that is then amplified to a high power level, typically approximately 2 watts, and applied to the antenna 202 via the switches 204,238. The antenna 202 converts the radio signal into electromagnetic radio waves which are received at the PCS1900 network 106.

During the second time slot 306, PCS1900 electromagnetic radio waves are converted to small electrical signals by the antenna 202. The PCS1900 radio receiver 240 amplifies the electrical signals and isolates the baseband information to generate an analog baseband information signal that is input to the PCS A/D converter 242. This analog baseband information signal is converted into digital format within the PCS A/D converter 242 and further input to the DSP 210. The DSP performs many functions on the received digital baseband information signal including demodulation, equalization, error detection and correction, and audio coding and decoding. As well, the DSP retrieves command and control information from the digital baseband information signal, converts this into a format suitable for the microcontroller 212, and inputs the result into the microcontroller 212 responsible for running the PCS1900 protocol. Audio information recovered by the DSP is input to the audio D/A converter 214, converted from analog to digital format, and used to drive the speaker 216.

During the second time slot, the DSP 210 determines the RSSI (Received Signal Strength Indication) and the BER (Bit Error Rate) of the currently operating base station. In order to measure the RSSI, the DSP 210 examines the magnitude of the received digital baseband information signal input from the PCS A/D converter 242. The DSP 210 sends a gain control signal to the PCS1900 radio receiver 240 used to adjust the gain of the analog baseband information signal to a predetermined constant level. By determining the amount of gain needed to adjust the baseband information signal, the DSP 210 can determine the strength of the incoming radio signal. The determination of the BER for the currently operating PCS1900 base station is done with use of channel coding. With channel coding, the DSP 210 is capable of detecting and correcting limited numbers of errors. The BER is calculated with the keeping of a log of the number of errors detected in a specific number of bits.

Figure 2:
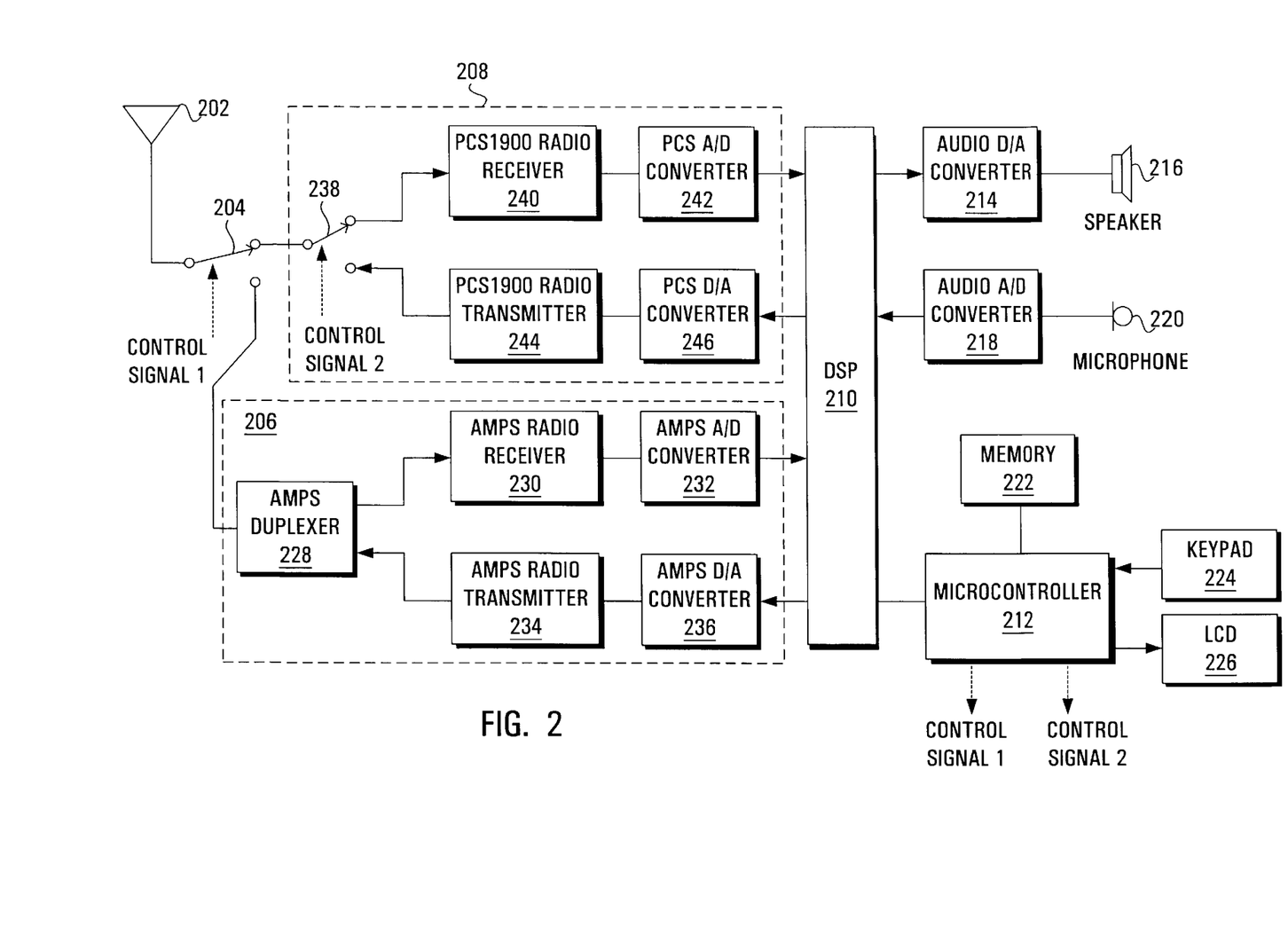
FIG. 2 is a block diagram of a PCS1900/AMPS multi-mode handset as contemplated by the preferred embodiment of the present invention.

During the third time slot 308, the multi-mode handset 102 of FIG. 2 monitors other PCS1900 base stations and compares their RSSI and BER with that of the currently operating base station. This is accomplished with a well known approach that receives PCS1900 electromagnetic radio waves transmitted from any local base station at the antenna 202 and with use of the antenna 202, the receive path of the PCS circuitry 208, and the DSP 210, determines the RSSI and the BER of the local base stations in similar fashion to that described above for the currently operating base station. By comparing these results with the known RSSI and BER of the currently operating base station detected during the second time slot 306, the DSP 210 determines whether a hand-over between PCS1900 base stations should be completed.

Figure 4:
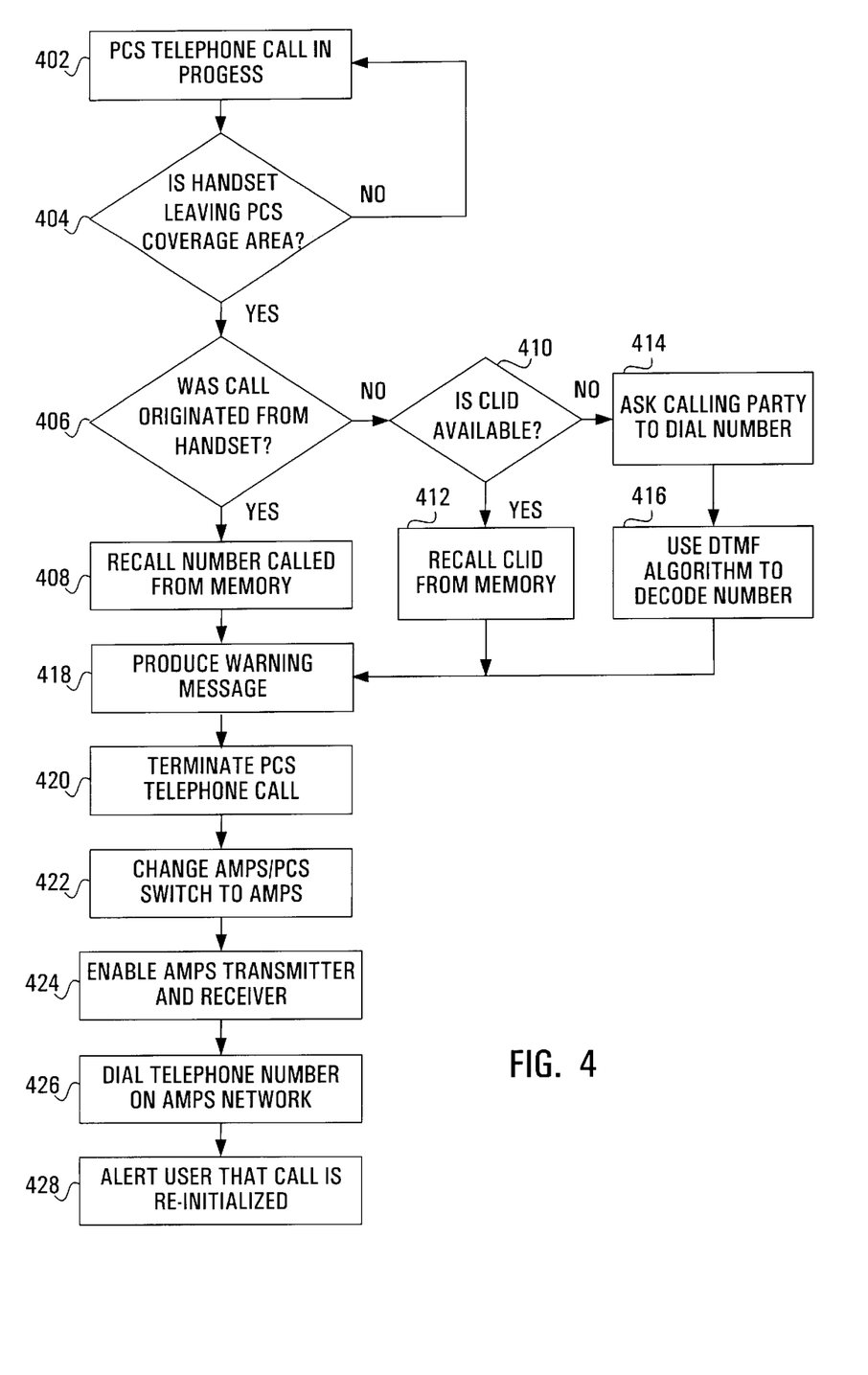
FIG. 4 is a flow chart illustrating the steps performed during the procedure contemplated by the preferred embodiment of the present invention.

The steps performed during the procedure contemplated by the preferred embodiment of the present invention are now described with reference to FIG. 4. The preferred embodiment of the present invention is a procedure to hand-over an active phone call from the PCS1900 network 106 to the AMPS network 110 in the situation that a multi-mode handset 102 is moving out of range of the PCS1900 base station. In prior art multi-mode handsets, the leaving of the PCS1900 coverage area while a PCS call is in progress would result in the telephone call becoming unclear or the complete termination of the call without warning.

Initially in the procedure contemplated by the present invention, a PCS telephone call is in progress between the PCS1900/AMPS multi-mode handset and a calling party as depicted at step 402. At step 404, the handset monitors whether the handset 102 is moving out of the PCS1900 coverage area. This is done with use of the standard PCS1900 TDMA frame structure 302. During the second time slot 306, the RSSI and BER from the current base station are determined by the DSP 210. If either result is not within a predetermined acceptable range, the call may become extremely unclear or be completely lost. To prevent this, the standard handset 102 monitors other PCS1900 base stations during the third time slot 308 to locate one which has an acceptable RSSI and BER. If the handset 102 is successful in finding such a PCS1900 base station, the handset 102 and PCS1900 network 106 will transfer the call through this new base station. If such an alternative PCS1900 base station is not available, it is concluded that the handset 102 is leaving the PCS1900 coverage area.

This conclusion is not made immediately, but after a delay period of a predetermined length, approximately 3 to 5 seconds in the preferred embodiment. This delay period is added to ensure that the multi-mode handset 102 is in fact leaving the PCS1900 coverage area and the reduced signal strength is not simply due to temporary fading factors. Radio fading occurs very rapidly, in milliseconds, and would not cause a sustained low RSSI reading, thus would not change the average RSSI values which typically are monitored. In the prior art handset, the call would simply be terminated with no warning once it was determined that the handset was leaving the PCS1900 coverage area.

In the case that it is determined that the handset 102 is leaving the PCS coverage area at step 404, the handset 102 contemplated by the present invention determines, at step 406, whether the call originally was initiated at the handset 102. This is done with the monitoring of a call initiation flag in the present invention, triggered at the start of a call when originated from the handset 102. In the case that the user of the handset 102 initiated the call, the telephone number corresponding to the party other than the user of the portable handset 102, hereinafter referred to as the other party, is saved by normal operating functions of a typical handset 102 within the memory 222 attached to the microcontroller 212. The saving of this number is typically done for use in the redial function available on typical handsets. As depicted at step 408, the number of the other party is recalled from the memory 222 and input to the microcontroller 212 in this circumstance.

If the initiation flag is not triggered at step 406, then it is concluded that the call was started by the other party. At step 410, the handset 102 determines if there is CLID (Calling Line Identification) available by monitoring for a CLID flag in the present invention. The CLID flag is triggered when the number corresponding to a calling party of an incoming call is decoded by the DSP 210 and sent to the memory 222 via the microcontroller 212 at the time of the incoming call. For CLID to be available, all networks in which the call is routed must support it. In the case that CLID is present, the microcontroller 212 recalls the telephone number of the calling party from the memory 222 at step 412.

In the circumstance that CLID is not available at step 410, the handset 102 contemplated by the preferred embodiment of the present invention sends at step 414 a message to the other party that requests the other party to dial their telephone number into the keypad of their handset. This is done with use of a well known speech synthesis algorithm as described in detail herein below at step 418. When the other party inputs their telephone number using a DTMF (Dual Tone Multi Frequency) keypad, the handset 102 decodes, at step 416, the number using a well known DTMF receiver algorithm and inputs the number into the microcontroller 212. Although such a DTMF receiver algorithm is not typically contained within a standard handset 102, one can normally be added without the requirement of additional DSP resources.

There exists an alternative solution to the case at step 410 of CLID not being available. The handset in one embodiment of the present invention could simply warn the user of the handset 102 and the other party, ask the other party to re-initiate the call on the AMPS network 110, and terminate the PCS1900 telephone call. Such a procedure could also be initiated in the circumstance that the other party does not dial their telephone number when requested at step 414, or that the other party has an older dial pulse telephone which does not support DTMF dialling.

After either one of steps 408, 412, or 416, the handset 102 as contemplated by the present invention produces, as depicted at step 418, a warning message for both the user of the handset 102 and the other party. This warning message is generated by the DSP 210 using a well known speech synthesis algorithm and is input to the speaker 216 via the audio D/A converter 214 and input to the antenna 202 via the PCS1900 transmit path. The speaker 216 broadcasts the audio message to the user of the multi-mode handset 102 while the antenna 202 transmits electromagnetic radio waves to the PCS1900 base station which results in the message eventually being received by the other party via the PCS1900 network 106 and the PSTN 112. A sample message that could be generated is "The PCS coverage area is ending, please hang up and your call will be re-established on an alternative network". It should be noted that standard multi-mode handsets do not typically contain a speech synthesis software algorithm. Therefore, such a software algorithm should be added to the DSP along with additional semiconductor memory capacity to store the digital representation of the message.

After the warning message has been produced at step 418, the handset 102 terminates the PCS1900 telephone call as depicted at step 420. This is done by a well understood procedure similar to that which takes place if the user of the handset 102 or the other party initiates the end of a call established with the PCS1900 network 106. At step 422, the microcontroller 212 controls the AMPS/PCS switch 204, through use of control signal 1, to select the AMPS mode of operation. Subsequently at step 424, the AMPS transmitter 234 and receiver 230 are enabled while the PCS1900 transmitter 244 and receiver 240 are disabled.

At this point, the multi-mode handset 102 dials, at step 426, the telephone number of the other party on the AMPS network as was input into the microcontroller at one of steps 408, 412, and 416. This dialling of the other party's telephone number is performed similar to the procedure done if the user of the telephone handset 102 had dialled the number. The microcontroller then alerts, at step 428, the user of the handset 102 via the LCD 226 and a short alert tone on the speaker 216 that the call has been re-initialized. The user can then proceed with the call via the AMPS network 110.

An additional aspect of the preferred embodiment of the present invention is the additional use of one of the five empty time slots 310 in the standard structure of a PCS1900 TDMA frame 302 to monitor the AMPS network 110. During one of the empty time slots 310, the AMPS/PCS switch 204 selects AMPS mode of operation and the AMPS radio receiver 230 is enabled. Subsequently, the RSSIs of a plurality of AMPS dedicated control channels are monitored with use of the AMPS radio receiver 230 and the DSP 210. If the RSSI of at least one of the AMPS dedicated control channels is above a predetermined threshold level, it is determined that the AMPS network is available for the handset 102 to transfer the active telephone call to. Before the start of the first time slot 304, the AMPS/PCS switch 204 reselects the PCS1900 mode of operation and the AMPS radio receiver 230 is disabled once again.

This monitoring of the AMPS network 110 with use of an additional time slot 310 can guarantee that a hand-over to the AMPS network 110 is possible since the handset 102 can ensure the presence of a suitable AMPS network 110. If it is found that there is not a suitable AMPS network 110, the portable handset 102 in a preferred embodiment of the present invention indicates, when the handset 102 is leaving the PCS1900 coverage area, that neither the PCS1900 network 106 or the AMPS network 110 is available to the portable handset 102. This indication can be done with use of the voice synthesis algorithm and/or the LCD 226.

The preferred embodiment of the present invention requires the DSP 210 to comprise additional speech synthesis and DTMF receiver algorithms along with the actual algorithm described as the present invention. In the preferred embodiment of the present invention, the DSP 210 used in the handset 102 has sufficient processor power and memory capacity to add these additional algorithms. This may require a new DSP with expanded memory capacity compared to a standard DSP used within a multi-mode handset. In the preferred embodiment, the speech synthesis algorithm requires only slight modifications from the VSELP (Vector Sum Excited Linear Predictive Coding) algorithm used to reproduce the received audio from the digital signals sent from the base station. Since no received audio signals from the base station would normally be processed while the speech synthesized message was being played, there would be no additional processing load on the DSP 210. The additional memory required to store 15 to 20 seconds worth of voice synthesis information is approximately 10 kBytes. The addition of the DTMF algorithm requires approximately 3 MIPS (million instructions per second) of processing power and 1 kByte of memory. These additional requirements are relatively small for new DSP chips that are on the market today. Therefore, a DSP 210 can be found that has sufficient processor power and memory capacity to allow for the implementation of the present invention.

The preferred embodiment of the present invention is for the hand-over from PCS1900 operation to AMPS operation with use of a PCS1900/AMPS multi-mode handset 102. The limited coverage area for the PCS1900 network 106 creates the need for such hand-overs of active calls between the networks. The hand-over between AMPS to PCS1900 operation is not commonly required since the AMPS coverage area comprises the PCS1900 coverage area and more. PCS1900/AMPS multi-mode handsets 102 typically default to PCS1900 operations to take advantage of the additional features available and only initiate calls on the AMPS network 110 if PCS1900 operation fails. With this invention, calls initiated on the PCS1900 network 106 can be transferred to the AMPS network 110 in the case that the handset 102 leaves the PCS1900 coverage area during the conversation. After the call is complete, the handset 102 would typically default back to the PCS1900 operation mode for the next call.

There exist alternative operating networks capable of having active calls transferred by the procedure described in the present invention. For example, the present invention could be implemented within a multi-mode handset comprising the capability of operating with TDMA (IS-136) or upband TDMA (J-Std-009) and AMPS networks or with CDMA (IS-95) or upband CDMA (J-Std-008) and AMPS networks. In this last situation, the additional aspect of monitoring the AMPS network during an active CDMA call could not be performed due to the lack of a time division structure in the CDMA standard.

The present invention could also be implemented within multi-mode handsets comprising the capability of operating within the GSM and DCS1800 (where DCS means Digital Communication System) networks. GSM has a very large coverage area in Europe while the DCS1800 network has limited coverage similar to PCS1900 in North America. There would be only minor modifications needed to adapt the present invention for this situation.

Yet another possible implementation of the present invention is within handsets capable of operating within a DECT (Digital European Cordless Telephone System) network and AMPS network. DECT networks are established with in building telephone systems. This invention could be used to transfer a telephone call from a DECT network to an AMPS network as a user of the handset leaves the building with the DECT system.

Persons skilled in the art will appreciate that there are alternative implementations and modifications possible to use the above algorithm to hand-over telephone calls between alternative operating networks, and that the above implementation is only an illustration of this embodiment of the invention. The scope of the invention, therefore, is only to be limited by the claims appended hereto.

What is claimed is:

1. In a portable telephone handset capable of functioning within a plurality of operating networks respectively operating under different standards, a method of handing an active telephone call over between networks to maintain the integrity of the call, the method comprising the steps of:

monitoring at least one signal parameter corresponding to a first operating network during a first active telephone call on the first operating network between a user of the portable handset and another party, the user of the handset or the other party being the calling party;

producing a warning message if the at least one signal parameter is not within a predetermined acceptable range, the step of producing a warning message comprising requesting both the user of the handset and the other party to hang up;

determining a telephone number corresponding to the other party if the telephone number can be accessed; and subsequent to both the user of the portable handset and the other party hanging up, initializing a second active telephone call from the portable handset to the other party on a second operating network if the telephone number corresponding to the other party can be accessed.

2. A method according to claim 1, wherein the step of producing a warning message is initiated only after the at least one signal parameter is not within the predetermined acceptable range for a predetermined delay period.

3. A method according to claim 1, wherein the at least one signal parameter corresponding to the first operating network is selected from the signal strength and the bit error rate.

4. A method according to claim 1, further comprising the step of determining that the calling party is the user of the portable handset, wherein the step of determining a telephone number corresponding to the other party comprises recalling from memory a telephone number dialled by the user of the portable handset to initiate the first active telephone call.

5. A method according to claim 1, further comprising the step of determining that the calling party is the other party, wherein the step of determining a telephone number corresponding to the other party comprises using a calling line identification means in the handset.

6. A method according to claim 1, further comprising the step of determining that the calling party is the other party, wherein the step of determining a telephone number corresponding to the other party comprises, prior to the step of requesting both the user of the handset and the other party to hang up, requesting the telephone number from the other party and decoding the telephone number when dialled by the other party.

7. A method according to claim 6, wherein the decoding means comprise a dual tone multi frequency (DTMF) receiver means.

8. A method according to claim 1, further comprising the step of indicating at the handset that the second active telephone call has been initiated with use of at least one of a display and an audio alert.

9. A method according to claim 1, further comprising the step of monitoring at least one signal parameter corresponding to the second operating network during the first active telephone call.

10. A method according to claim 9, wherein the first operating network is a Time Division Multiple Access (TDMA) network which communicates with use of a plurality of TDMA frames, each frame comprising:

a first time slot in which the portable handset transmits data information;

a second time slot in which the portable handset receives data information, the data information used in the monitoring of the at least one signal parameter corresponding to the first operating network;

a third time slot in which the portable handset receives information used in the step of monitoring at least one signal parameter corresponding to a first operating network; and a fourth time slot in which the portable handset receives information used in the step of monitoring at least one signal parameter corresponding to a second operating network.

11. A method according to claim 9, wherein the at least one signal parameter corresponding to the second operating network is selected from the signal strength and the bit error rate.

12. A method according to claim 1, wherein one of the first and second operating networks is an AMPS (Advanced Mobile Phone System) network.

13. A method according to claim 1, wherein one of the first and second operating networks is a PCS1900 (Personal Communication System) network.

14. A method according to claim 1, wherein one of the first and second operating networks is an upband TOMA (Time Division Multiple Access) network.

15. A method according to claim 1, wherein one of the first and second operating networks is an upband CDMA (Code Division Multiple Access) network.

16. A telephone portable handset capable of functioning within a plurality of operating networks respectively operating under different standards, the portable handset comprising:

a monitoring means used to periodically determine at least one signal parameter corresponding to a first operating network during a first active telephone call between a user of the portable handset and another party;

a warning means used to send a warning message to the user of the portable handset and the other party if the at least one signal parameter is not within a predetermined acceptable range, the warning message comprising a request for the user of the handset and the other party to hang up their handsets;

a telephone number determining means used to determine a telephone number corresponding to the other party; and an initiation means used to initiate a second active telephone call on a second operating network from the portable handset to the other party using the telephone number corresponding to the other party subsequent to the user of the handset and the other party hanging up their handsets.

17. A portable handset according to claim 16, wherein the monitoring means comprises at least one of a digital signal processor (DSP) and a radio receiver.

18. A portable handset according to claim 16 further comprising a second monitoring means used to periodically determine at least one signal parameter corresponding to the second operating network during the first active telephone call.

19. A portable handset according to claim 16, wherein the telephone number determining means comprises:

a memory storage device used to store the telephone number corresponding to the other party when the telephone number is dialled by the user of the portable handset to Initiate the first active telephone call; and a microcontroller used to extract the telephone number from the memory storage device if the at least one signal parameter is not within the predetermined acceptable range.

20. A portable handset according to claim 16, wherein the telephone number determining means comprises:

a calling line identification device used to determine the telephone number corresponding to the other party if the other party initiated the first active telephone call;

a memory storage device used to store the telephone number determined from the calling line identification device; and a microcontroller used to extract the telephone number from the memory storage device if the at least one signal parameter is not within the predetermined acceptable range.

21. A portable handset according to claim 16, wherein the telephone number determining means comprises:

a first memory storage device used to store the telephone number corresponding to the other party when the telephone number is dialled by the user of the portable handset to initiate the first active telephone call;

a calling line identification device used to determine the telephone number corresponding to the other party if the other party initiated the first active telephone call;

a second memory storage device used to store the telephone number determined from the calling line identification device if the other party initiated the first active telephone call; and a microcontroller used to extract the telephone number from one of the first and second memory storage devices if the at least one signal parameter is not within the predetermined acceptable range; and whereby the microcontroller extracts the telephone number from the first memory storage device if the user of the portable handset initiated the first active telephone call and the microcontroller extracts the telephone number from the second memory storage device if the other party initiated the first active telephone call.

22. A portable handset according to claim 16, wherein the warning means sends the warning message only after the at least one signal parameter is not within the predetermined acceptable range for a predetermined delay period.

23. A portable handset according to claim 16, wherein the at least one signal parameter corresponding to the first operating network is selected from the signal strength and the bit error rate.

24. A portable handset according to claim 16, further comprising means for indicating at the handset that the second active telephone call has been initiated with use of at least one of a display and an audio alert.

25. A portable handset according to claim 16, wherein the telephone number determining means comprises:

means for requesting a telephone number from the other party prior to the warning means sending the request for the user of the handset and the other party to hang up their handsets; and means for decoding the telephone number when dialled by the other party.

26. A portable handset according to claim 25, wherein the requesting means comprise a speech synthesis apparatus.

27. A portable handset according to claim 25, wherein the decoding means comprise a dual-tone multi frequency (DTMF) receiver.

28. In a portable telephone handset capable of functioning within a plurality of operating networks respectively operating under different standards, a method of handing an active telephone call over between networks to maintain the integrity of the call, the method comprising the steps of:

monitoring at least one signal parameter corresponding to a first operating network during a first active telephone call on the first operating network between a user of the portable handset and another party, the user of the handset or the other party being the calling party; and producing a warning message if the at least one signal parameter is not within a predetermined acceptable range, the step of producing a warning message comprising requesting both the user of the handset and the other party to hang up and requesting the other party to initialize a second active telephone call on a second operating network after hanging up.

29. A telephone portable handset capable of functioning within a plurality of operating networks respectively operating under different standards, the portable handset comprising:

a monitoring means used to periodically determine at least one signal parameter corresponding to a first operating network during a first active telephone call between a user of the portable handset and another party; and a warning means used to send a warning message to the user of the portable handset and the other party if the at least one signal parameter is not within a predetermined acceptable range, the warning message comprising a request to both the user of the handset and the other party to hang up and a request to the other party to initialize a second active telephone call on a second operating network after hanging up.

* * * * *